US006931558B1

(12) United States Patent
Jeffe et al.

(10) Patent No.: US 6,931,558 B1
(45) Date of Patent: Aug. 16, 2005

(54) COMPUTER RESTORATION SYSTEMS AND METHODS

(75) Inventors: Peter Jeffe, Austin, TX (US); Bruce Bramhall, Pflugerville, TX (US)

(73) Assignee: VERITAS Operating Corporation, Mountain View, CA (US)

(*) Notice: Subject to any disclaimer, the term of this patent is extended or adjusted under 35 U.S.C. 154(b) by 532 days.

(21) Appl. No.: 09/998,246

(22) Filed: Nov. 30, 2001

Related U.S. Application Data

(60) Provisional application No. 60/250,200, filed on Nov. 29, 2000.

(51) Int. Cl.$^7$ ............................................. G06F 1/24
(52) U.S. Cl. ........................ 713/340; 714/2; 714/7; 714/13; 714/15
(58) Field of Search ............................... 713/300, 340; 714/1, 2, 7, 13, 15

(56) References Cited

U.S. PATENT DOCUMENTS

| | | | |
|---|---|---|---|
| 5,452,454 A | | 9/1995 | Basu |
| 5,828,887 A | | 10/1998 | Yeager et al. |
| 5,930,824 A | | 7/1999 | Anglin et al. |
| 6,065,123 A | * | 5/2000 | Chou et al. ................. 713/322 |
| 6,243,831 B1 | * | 6/2001 | Mustafa et al. ............... 714/24 |
| 6,317,826 B1 | | 11/2001 | McCall et al. |
| 6,530,050 B1 | * | 3/2003 | Mergard ..................... 714/726 |
| 6,535,976 B1 | * | 3/2003 | Hoggarth et al. ............... 713/2 |
| 6,708,283 B1 | * | 3/2004 | Nelvin et al. .................. 714/5 |
| 6,785,695 B1 | | 8/2004 | Hamilton, II et al. |
| 6,802,025 B1 | | 10/2004 | Thomas et al. |

\* cited by examiner

OTHER PUBLICATIONS

International Search Report application No. PCT/US01/44941.

*Primary Examiner*—Rehana Perveen
(74) *Attorney, Agent, or Firm*—Meyertons Hood Kivlin Kowert & Goetzel, P.C.; B. Noël Kivlin

(57) ABSTRACT

A method restores a client device of a network on major failure of the client device. The client device is incapable of automatically booting on its own. The network includes a server computer. The method includes booting the client device over the network in the restoration operation, configuring the client device according to the boot program and saved configuration states for the client device, and copying files to the client device in accordance with the configuration. The client computer has access to a storage manager application, such as a server computer of the network operating a storage management software program. All client files, including configuration files, as well as application and data files, of the client device are saved on the network by the storage manager application. The client device is booted over the network, rather than locally to the client device by boot disk or otherwise. The boot program is loaded to the client device, and the client device retrieves configuration and file information over the network from the storage manager application. The client device configures its disk according to the configuration information, and then all other files and data of the client device at the time of failure of the client device are saved on the disk substantially in the condition and state just prior to the failure and as most recently backed up to the storage manager application. Alternatively, the client device is reset and booted via a control device either locally or otherwise connected to the client device, and substantially according to the method of the network boot.

23 Claims, 5 Drawing Sheets

COMPUTER RESTORATION SYSTEMS AND METHODS

This application claims the benefit of U.S. provisional application Ser. No. 60/250,200, entitled "Computer Restoration Systems and Methods", filed Nov. 29, 2000.

BACKGROUND OF THE INVENTION

The present invention generally relates to computers and local and wide area interconnected computers and data communications networks and, more particularly, relates to restoration of computer systems backed up on storage managers, such as in a network, upon a crash or other similar event which prohibits normal boot up operations.

Computer boot disk crashes and similar major machine failure events, in which normal boot up operations are thereafter not possible or are otherwise hindered, are problematic in several respects to system administrators. Conventionally, such events have required system administrators to completely reconfigure the crashed computer, including, without limitation, by reconfiguring machine non-volatile random access memory (NVRAM) settings, loading the computer operating system, replacing applications and files, retrieving backed up data, and thoroughly re-configuring the operating system, application programs, drivers, and other operational settings.

Even in instances in which a crash or similar systems failure event does not require complete restoration of the computer system by the system administrator, a boot disk, as well as other configurational set ups, are typically required. Boot disks and other set up tools are often not readily available in the location of each computer of a network or other wide area system. Moreover, to restore computer systems of such an arrangement requires significant time and effort, including to format disk drives, replace or fix operating systems and errors, reload applications, retrieve backed up data, and routinely save, as well as additionally reinstitute, operating, network, and application settings to those at the point of the crash.

Typically, networks and system components of the networks, particularly distributed and interconnected computers of the networks, are backed-up in normal system maintenance and administration operations. The backups can include backup of the system itself, as well as backup of data and applications. Particularly in enterprise computing systems, each computer of the enterprise network can be backed up regularly (or as otherwise scheduled or desired) as to data and applications by use of a storage manager software application. Present storage manager applications provide file and data-oriented backups of each computer. A number of different software storage manager applications are available for the enterprise computing environment, for example, the TSM software of Tivoli Systems (an IBM Corporation subsidiary), Veritas, Legato, and others.

Although these presently available storage manager backup resources are available in the several enterprise computing software packages, the packages have not made it possible to automatically or readily restore any or each particular computer or other element of the computing enterprise. The back-up data has merely been available to assist the system administrator to re-copy and otherwise re-set each computer to the data and application status then maintained in back-up. The back-ups from these packages are merely file and data backups, and can not provide complete restoration of the system.

In order to provide complete system backups, including, for example, operating system, drivers, and other machine configuration backup, additional backup resources are required, such as "mksysb" images and "savevg" commands on AIX, a product like Disk Image on Windows, or otherwise. Such system backups, as compared to file and data backups of storage manager applications, are not available in many operating systems. Even when such system backup is maintained and available, machine restoration in the event of major failure has typically been achieved by system administrators only by separately employing such system backup to restore the basic operating system and machine configuration, and then a separate file and data backup of a storage manager application has been employed to restore the rest of the machine's data and applications.

The conventional backup and restoration of computers of the enterprise network has been problematic. For example, the system and file/data backups which must be maintained in order to perform the restoration are redundant and waste valuable storage space, network bandwidth, and effort. File and data backups, for instance, are often saved on individual machines of the network by the backup function of the respective operating system of each machine. System backup information is similarly saved or has even been maintained in hard copy or other manual operation. Any backups of the system and file/data that are saved on the network are, therefore, redundant. Moreover, the conventional system backups, for example Ignite on HP-UX, NIM on AIX or others, are often out of date because such backups are not usually performed as frequently as backups of applications and data performed by the storage manager application. The duplicate backup procedures required for system configuration data, on the one hand, and application files and data, on the other hand, together with various individual machine and network backup operations, increase the potential for human error when restoring from the backups. System administrators must juggle tapes and resolve tape access conflicts between the various backups, including the separate storage manager backup and the system backup. Also, the machine restoration process typically requires separate steps of re-installation of the device operating systems, followed by restoration from backup of application and data files. These separate re-installation of system configurations, on the one hand, and restoration of application and data file backups, on the other hand, are largely manual operations which are time consuming and themselves error-prone.

It would be a significant improvement in the art and technology to provide computer machine restoration systems and methods that alleviate many of the problems of the conventional backups and restoration processes, and that provide advantages of time savings, limited manual involvement, and ready and automatic availability of resources for performing the restoration.

SUMMARY OF THE INVENTION

An embodiment of the invention is a device restoration system. The device restoration system restores a client device to a state prior to a major failure. The system includes a server device, a network communicatively interconnecting the client device and the server device, a storage manager accessible to the server device for saving the state, and a boot process in which the client device boots either from a server device over a network, or from locally attached media, for example tape, CD-ROM, or floppy disk.

Another embodiment of the invention is a method of restoring a client device of a network on failure of the client device. The network includes a server computer. The method includes booting the client device via a network or local media boot, creating a boot program for operation on the client device, configuring the client device according to the boot program and a saved configuration state, and copying files to the client device in accordance with a configuration from the step of configuring.

Yet another embodiment of the invention is a method of restoring a client device of a network. The network includes a server device. The server device has a storage manager application. The method includes backing up configuration data, as well as application and data files, by the storage manager application, and restoring the backed up configuration data, as well as application and data files, from the step of backing up, to the client device over the network.

BRIEF DESCRIPTION OF THE DRAWINGS

The present invention is illustrated by way of example and not limitation in the accompanying figures, in which like references indicate similar elements, and in which.

DETAILED DESCRIPTION OF PREFERRED EMBODIMENTS

Figure 1:
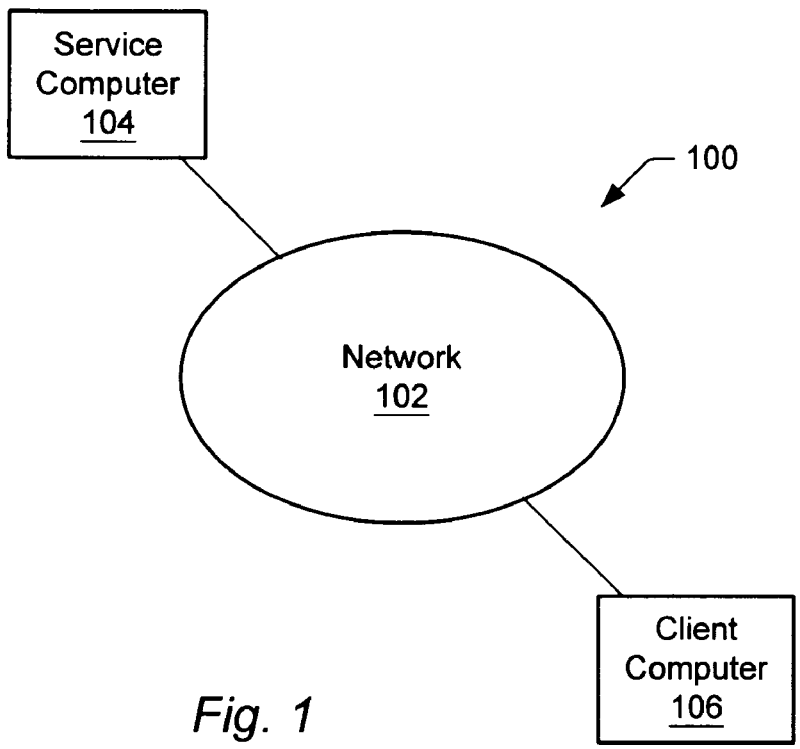
FIG. 1 illustrates a network, including a client computer and a server computer connected over the network, for performing a restoration operation of embodiments of the present invention on failure of the client computer.

Referring to FIG. 1, a network 100 includes network elements 102 communicatively interconnecting a server computer 104 and a client computer 106. The network elements 102 include any of a wide variety of conventional networking components and connectors, such as additional server computers, client computers, and connection cables or channels, wired, wireless or otherwise. The server computer 104 is any processing device that is communicatively connected by the network elements 102 to the client computer 106. The server computer 104 is, for example, a computer device equipped with software to act as a server of information requested by one or more client devices over the network 100 and is, typically, a conventional server computer of an enterprise network of communications and computing elements. The server computer 104 serves to receive requests over the network 100, for example, requests from the client computer 106, and in response to those requests the server computer 104 returns a response over the network 100. The server computer 104 is particularly capable of acting as a storage manager for interconnected elements and devices of the network or of communicating with a separate computer (not shown in FIG. 1) that performs storage management functions.

The client computer 106 of the network 100 is, likewise, any processing or communications device that is capable of communicating with the server computer 104 over the network 100, by making requests or otherwise. The client computer 106 is, for example, a desktop or workstation computer. The network 100 is any of a variety of networking and communications interconnections, such as an intranet, the Internet, a dedicated network, or other communications network. The network 100 is operable according to a particular packetized data protocol, such as transport control protocol/Internet protocol (TCP/IP) or some other network protocol. The server computer 104 and the client computer 106 communicate over the network 100 via the particular protocols of the network, such as, for example, according to the standard Internet network protocol TCP/IP. In normal operations, the client computer 106 makes requests over the network 100 according to the particular protocols of the network 100, and the server computer 104 responds over the network 100 in answer to the requests. If there occurs any major failure of the client computer 106, the client computer 106 can not boot and can not communicate with the server computer 104 in such manner or otherwise properly operate.

In the network 100, the server computer 104, in conjunction with the client computer 106, can perform an automatic restoration operation to the client computer 106, which enables complete boot-up, reconfiguration, and restoration of systems, files, and data to the client computer 106. This automatic restoration operation is performed without a boot disk at the client computer 106 and includes both system restoration and file and data restoration. In effect, the restoration operation performed by the network 100, via the server computer 104 and the client computer 106, completely restores the client computer 106 to the state at the time of the failure.

Figure 2:
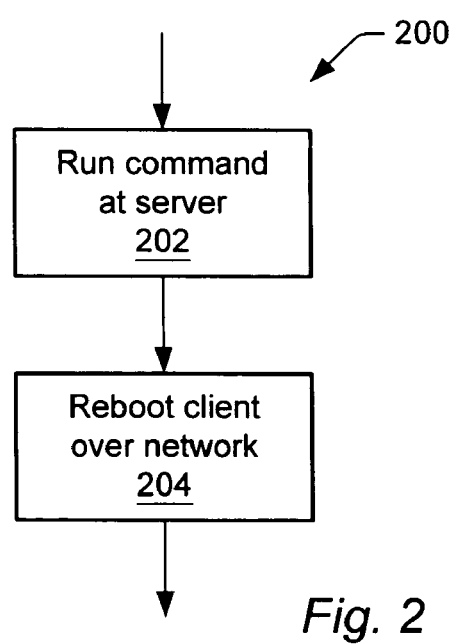
FIG. 2 illustrates a method of the restoration operation performed on the network, including the client computer and the server computer, of FIG. 1, according to embodiments of the present invention.

Referring to FIG. 2, a method 200 is performed by the server computer 104 and the client computer 106 of the network 100 of FIG. 1, in order to restore the client computer 106 on major failure that prohibits normal boot of the client computer 106. In the method 200, a command is run in a step 202 at the server computer 106 by the system administrator or other user of the server computer 106. The step 202 initiates a network reboot of the client computer 106 in a step 204. The network reboot of the step 202 restores the client computer 106 in all respects, including the systems and application and data files of the client computer 106 at the time of the failure of the client computer 106.

In the method 200, the server computer 104 maintains, or otherwise has access to, a storage manager device or software application. Such storage managers are conventional and typically serve to back up to server devices, such as the server computer 104, and restore data of client devices, such as the client computer 106. These storage managers generally do not back up all files, but only back up application files and data. Machine configuration states are not typically backed up. In the present embodiments, the entirety of the client computer 106 is backed up by the storage manager, that is, all files of the client computer 106, including machine configuration states, as well as the usual application files and data of the client computer 106, are backed up to the storage manager. Backups of the client computer 106 which follow an initial full backup of all configuration and file and data files of the client computer 106 can be incremental backups of only changed information since an immediately prior backup. By backing up machine configurations of the client computer 106, at the regular and periodic backup times for backup operations of the storage manager in backing up application and data files of the client computer 106, the system configurations, as well as all applications and data, are backed up by the storage manager. These full backups by the storage manager are employed to restore the client computer 106 on failure, as further described here.

Figure 3:
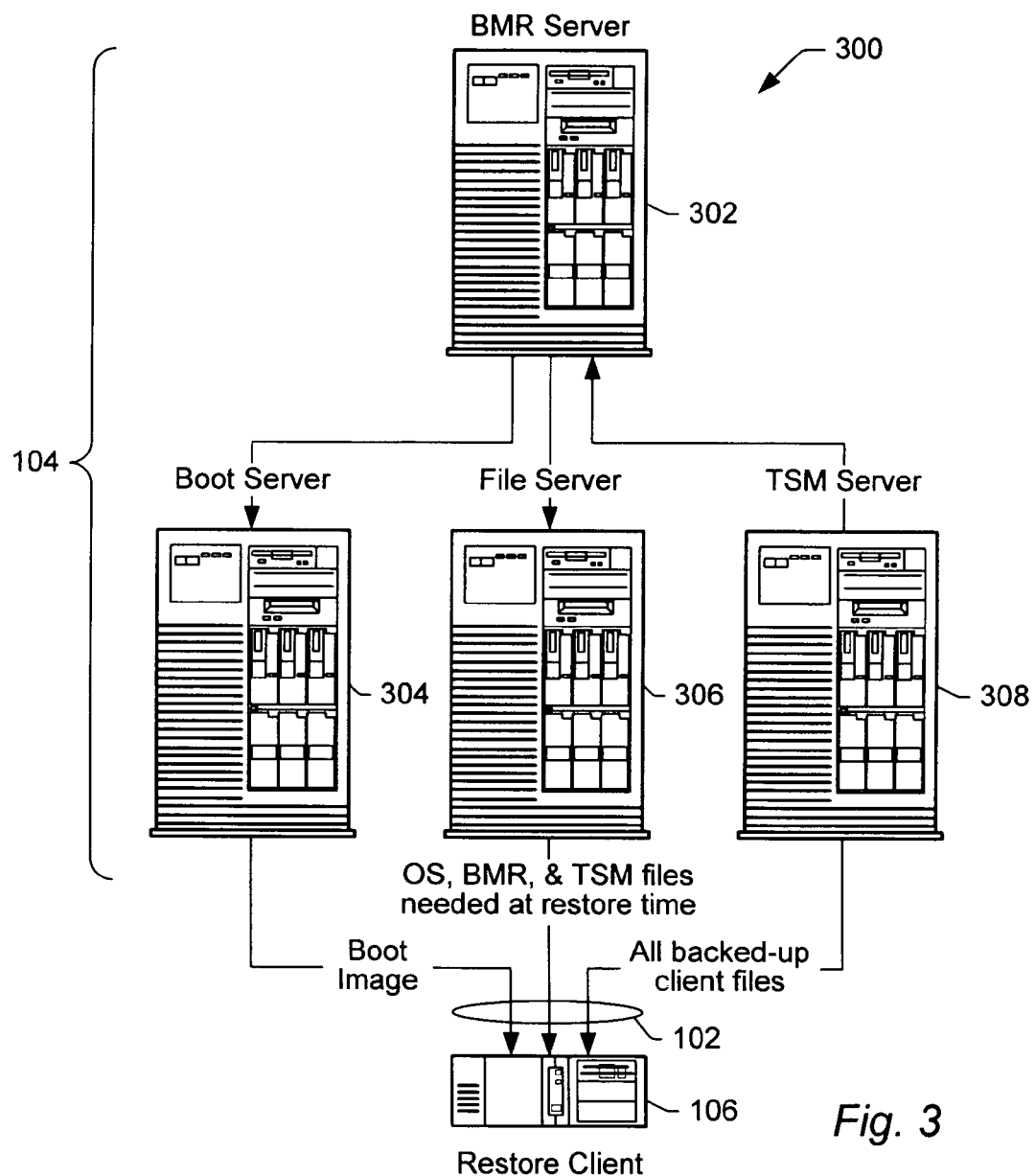
FIG. 3 illustrates the server computer, including components of a restore server, a boot server, a file server and a storage management server, and the client computer, each of FIG. 1, according to embodiments of the present invention.

Referring to FIG. 3, the server computer 104 of FIG. 1 includes four separate, distinct server components 300, identified in FIG. 3 as a bare metal restore (BMR) server 302, a boot server 304, a file server 306, and a storage manager (SM) server 308. Each of the boot server 304, the file server 306 and the SM server 308 is communicatively connected to the BMR server 302. The server components 300 are also communicatively connected to the client computer 106 over the network elements 102. Although the respective server components 300 are illustrated in FIG. 3 as distinct and separate server computers, the server components 300 are merely functions that can be performed and available on any number and arrangement of computing devices with server functionality. The server components 300 can be each located on and performed by separate server devices, or can be grouped onto a single server device or combinations, banks, or other arrangements of server devices. The server devices functioning as the server components 300 can be centrally located or disparately located devices, all in communication over the network 100 according to appropriate protocols and features.

Figure 4:
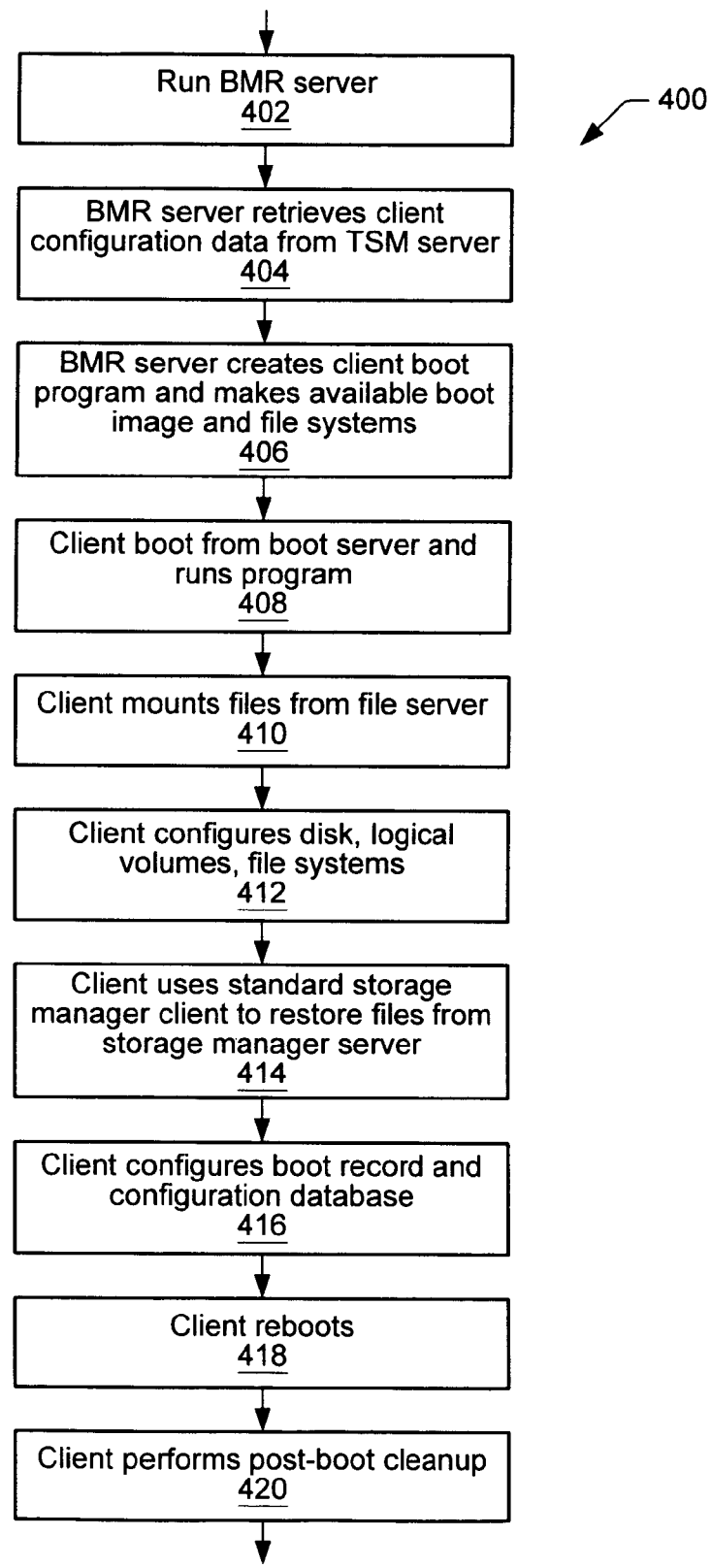
FIG. 4 illustrates a method of restoration of a computer upon operational failure, according to embodiments of the present invention.

Referring to FIG. 4, a method 400 restores the system and application and data files to the client computer 106 of FIGS. 1 and 3, upon a major failure of the client computer 106. The method 400 is performed between the server components 300 and the client computer 106 over the network 100 and, thus, the restoration method 400 can be initiated, performed and completed from a location remote from the location of the client computer 106. No boot disk or boot efforts are required directly at the location of the client computer 106. Rather, an external source or media attached to the client computer 106, such as, for example, the server components 300 in communication with the client computer 106 over the network 100, or alternatively an attached media and media read device, such as tape, CD-Rom, or floppy disk, serves to allow the client device 106 to boot from the server components 300 or media device, as applicable. In such event, the server components 300 or media device, as applies, permits the client computer 106 to perform the boot process. The hard drive and other memory of the client computer 106 is not required in order for the client computer 106 to so boot.

Remote re-boot and restoration of the client computer 106 according to the method 400, such as via communications of the client computer 106 with networked elements like the server components 300, are possible if the client computer 106, upon failure, retains sufficient unaffected resources to communicate over the network 100 with the server components 300 to reboot via communicated commands with the server components 300. Remote re-boot and restoration can also occur according to the method 400, for example, in the case of a system like an AIX SP node, where the physical "front panel" (i.e., on, off, reset and similar control circuitry and equipment) of the client computer 106 can be manipulated through software from another device, so that the controlling device can electrically (and, if necessary, mechanically) initiate a reset as if the reset button on the client computer 106 is triggered. In either event, communications with devices external to the client computer 106, either over the network 100 by the server components 300 or with a connected controlling device, enable the complete restore operation.

The method 400 is commenced in a step 402 at the BMR server 302 by a user, for example, a system administrator of the network 100, by a run command input to the BMR server 302. This run command of the step 402 causes the BMR server 302 to configure the boot server 304 and the file server 306 to initiate restoration and indicates that the particular client computer 106 is to be configured and restored. In a step 404, the BMR server 302 then retrieves configuration data regarding the client computer 106 from the SM server 308. The configuration data so retrieved is the most recently backed up machine configuration states, as saved by the storage manager.

The SM server 308 is a conventional storage manager application that serves to periodically backup and save application and file information present on the client computer 106, as well as on all other client devices of the network enterprise. An example of the storage manager application of the SM server 308 is the TSM™ software of Tivoli Systems (an IBM Corporation subsidiary). Other examples include the storage manager products of Veritas, Legato, Computer Associates, and others. All such storage manager applications include features enabling backups of client devices, such as application programs, data files, and user-settings. These storage manager applications typically provide backup of application files, data and only certain user-settings, primarily related to the application files, and do not usually provide storage for operating systems, log files, and other device-specific system configurations and information. With the present embodiments, however, the storage manager backs up all of the client computer 106 files, including the client machine configuration settings, as well as the application and data files. As previously mentioned, this backup can be incremental with each regularly scheduled backup operation performed by the storage manager, such that only changes since an immediately prior backup are backed up with the backup operation.

In a step 406, the BMR server 302 creates a client boot program and makes available over the network a boot image and file systems for the client computer 106 being restored. The client boot program is delivered over the network 100 to the client computer 106 once the client computer 106 initializes over the network in a network boot operation. The boot image and file systems are saved at the boot server 304 and the file server 306, respectively, and via the network boot process and client boot program are accessible to the client computer 106 over the network 100 for initiation of restoration operations. In the following, a network boot process (e.g., with the network 100 and server components 300) is primarily described, however, it is to be understood that the substantially similar boot process is achieved with such controlling device that is connected locally or otherwise to the client computer 106 to effect resetting.

The client computer 106 next is booted from the boot server 304 and runs the client boot program to retrieve boot information from the boot server 304 and file systems from the file server 306 over the network 100. The network boot performed by the client computer 106 in such manner uses the standard "bootp" and/or "bootparams" protocols to network boot the client computer 106 from the boot server 304. The client boot program continues to operate at the client computer 106 to perform the boot over the network 100 and to enable client computer 106 access to system configuration files from the file server 306 and application and data files from the SM server 308.

In a step 410, the client computer 106, via network 100 communications between the client computer 106 and the file server 306, mounts configuration files from the file server 306. Based on the files so mounted from the file server 306, the hard disk of the client computer 106 is configured in a step 412, and appropriate disk configurations such as partitions, volume groups, logical volumes and files systems are set up. Once so configured, the client computer 106 uses the standard storage manager client application in a step 414 to restore files from the SM server 308 to the client computer 106. The standard storage manager client application is the client software or other application which is required by the particular storage manager application for the client device, such as the client computer 106, to communicate with the storage manager for backup and restore operations. Once the client computer 106 has been reconfigured from the network boot by the boot server 304, the client boot program, and configuration files of the file server 306 in the steps 408, 410, 412, the standard storage manager client application operates to restore the application and data files in typical manner.

In a step 416, the client computer 106 configures a boot record and configuration database for the client computer 106, in order that the client computer 106 will have them available for next client boot operations. The client computer 106 thereafter reboots, in typical manner, in a step 418. An added step 420 of post-boot clean-up can be required. In the step 420, any client computer 106 settings and data that are not fully restored from the rest of the method 400 are adjusted manually or by maintenance programs or routines available at the client or over the network 100, as the case may be.

Figure 5:
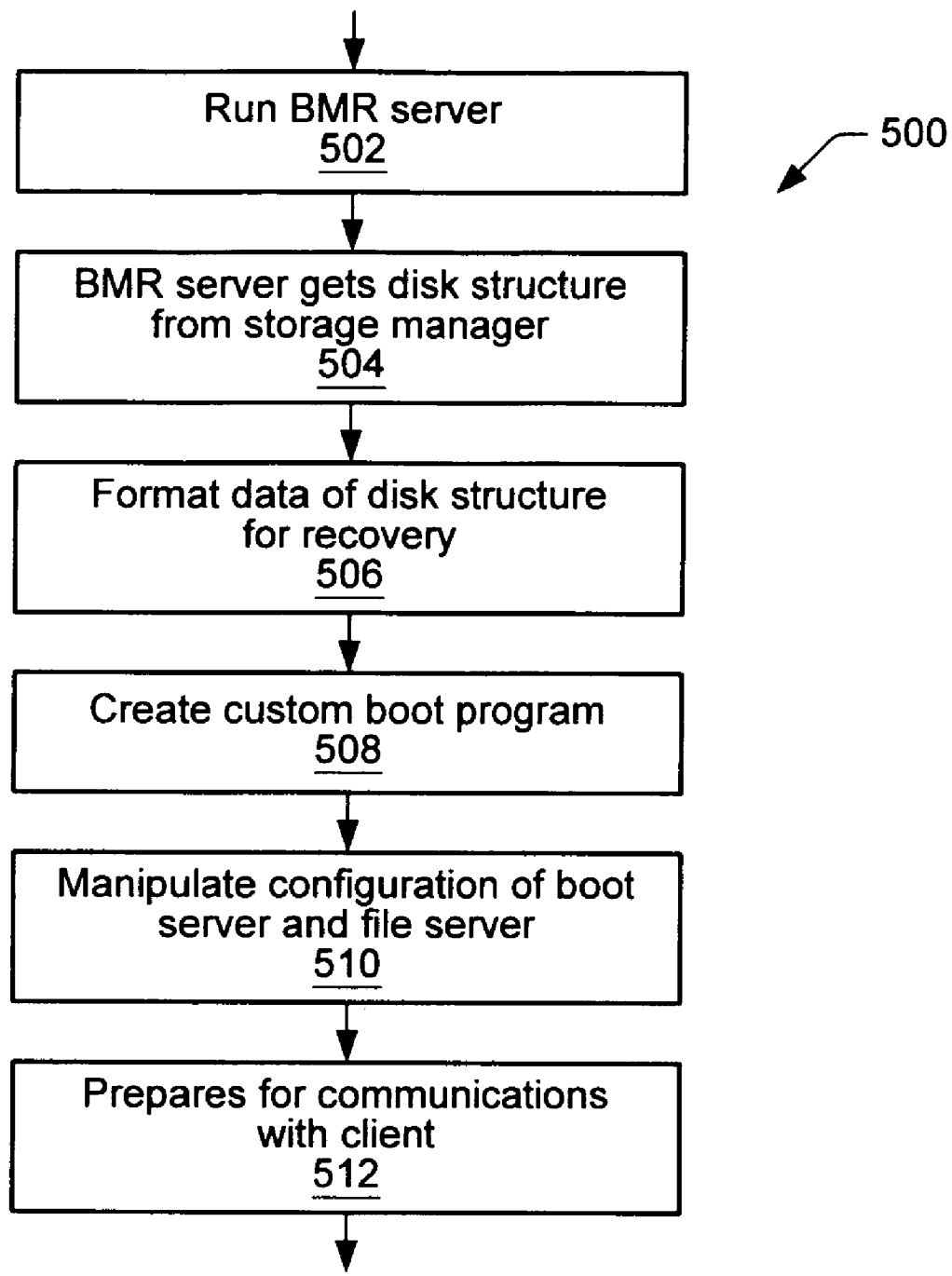
FIG. 5 illustrates a method of operation of the server computer of FIGS. 1 and 3, according to embodiments of the present invention.

Referring to FIG. 5, details are illustrated of a method 500 of operation of the BMR server 302, and other server components 300, in restoration of the client computer 106 according to the methods 200, 400 of FIGS. 2 and 4, respectively. A step 502 is initiated by a user (e.g., system administrator) directing the BMR server 302 to commence a restore operation of the particular client computer 106. The step 502 includes, for example, input by the user to the BMR server 302 of a run command for the restore method 500.

In a step 504, the BMR server 302 retrieves or otherwise attains the appropriate disk structure for the particular client computer 106, for example, by retrieving such structure information from the storage manager application or other storage or application, through communications over the network 100 or otherwise as applicable. A step 506 follows, in which the format data is retrieved or otherwise attained of the disk structure for the particular client computer 106 to be recovered. The format data is available through communications over the network 100 or otherwise as applicable.

Thereafter, in a step 508, the BMR server 302 creates a custom boot program for the particular client computer 106. The custom boot program includes information necessary to the client computer 106 to initiate a succeeding network boot and to locate and access machine configuration data and application and data files on the network 100, such as from the file server 306 and the SM server 308. The access to data and files triggered by the boot program is made through communications over the network 100 or otherwise.

In a step 510, the BMR server 302 manipulates configuration of the boot server 304 and the file server 306 to enable those servers 304, 306 to be available to the particular client computer 106 over the network 100 for the network boot and restore operations. Next, in a step 512, the BMR server 302 prepares the respective server components 302, 304, 306, 308 and the client computer 106 for communications therebetween over the network 100.

Figure 6:
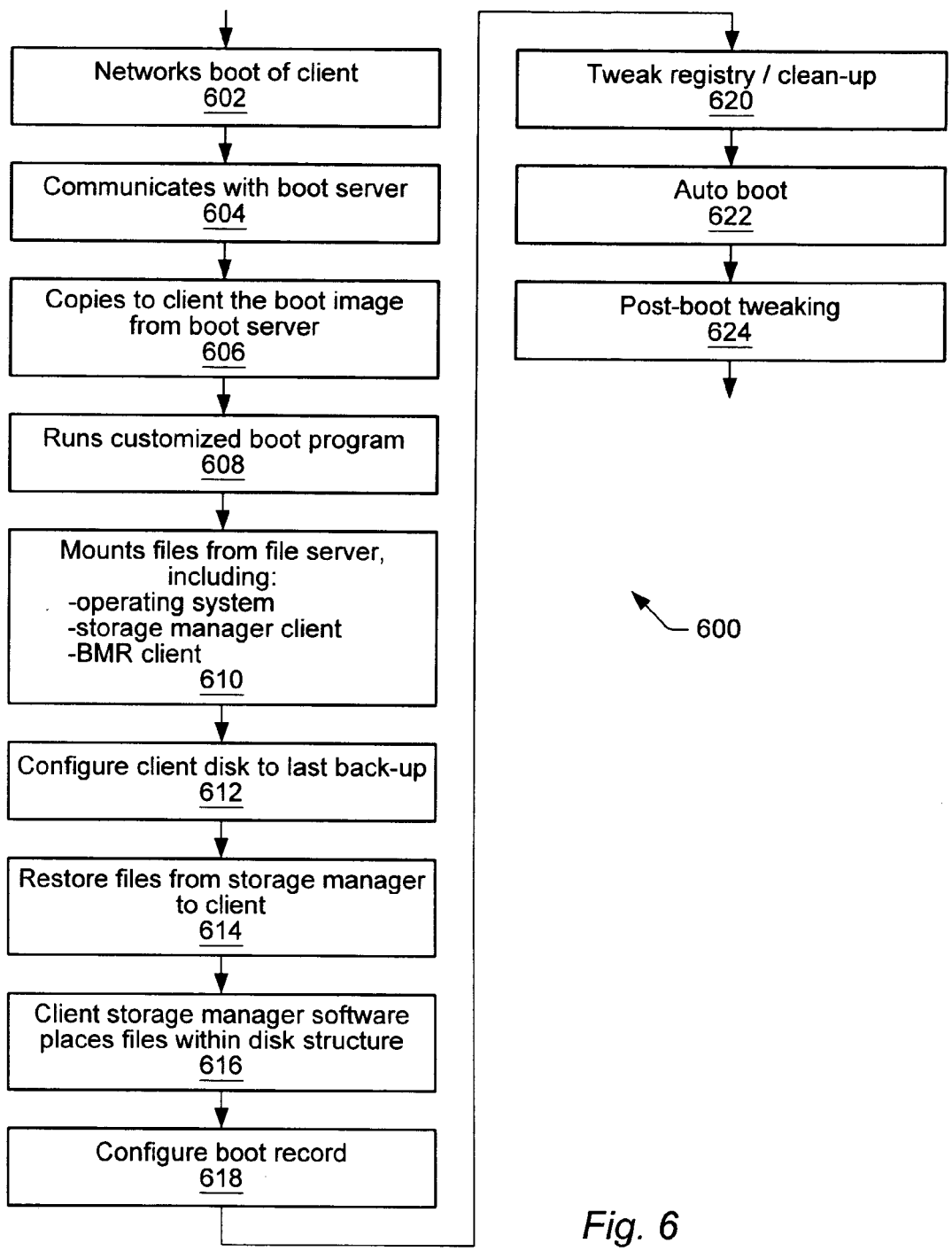
FIG. 6 illustrates a method of operation of the client computer of FIGS. 1 and 3, according to embodiments of the present invention.

Referring to FIG. 6, a method 600 is performed by the client computer 106 to restore the client computer 106 on major failure. A network boot of the client computer 106 is performed in a step 602. As previously mentioned, the network boot is a standard network boot operation, initiated by the client computer 106 via the boot server 304 in communication over the network 100 with the client computer 106. The client computer 106 communicates with the boot server 304 in a step 604, in performing the network boot operation. The client computer 106 next receives over the network 100 in a step 606 the boot image for the client computer 106 from the boot server 304, and the boot image is copied to the client computer 106, for example, to random access memory (RAM).

In a step 608, the client computer 106 runs the customized boot program for the particular client computer 106, as obtained by the client computer 106 via communications over the network 100 from the BMR server 302. The client computer 106 next, in a step 610, mounts the system configuration files for the client computer 106, as accessed via communications over the network 100 with the file server 306. The files mounted to the client computer 106 from the file server 306 in the step 610 include the operating system for the client computer 106, the storage manager client software application which is the standard client application for the particular storage manager, and a BMR client software application that enables the client computer 106 to interact with the BMR server 302 over the network 100 to perform the restoration.

In a step 612, the hard disk of the client computer 106 is configured to match the most recent back-up saved by the storage manager. In the step 612, the client computer 106 communicates over the network 100 with the SM server 308 to recover from the storage manager the appropriate configuration information. Next, in a step 614, the application and data files of the client computer 106 are restored from the storage manager, through communications by the client computer 106 with the SM server 308. The client storage manager software, that is, the typical client software that operates with the particular storage manager application to restore data from the storage manager, places the backed-up files from the storage manager within the disk structure of the client computer 106. The step 612 could alternately involve communications with or by other or additional elements, rather than or in combination with the SM server 308; for example, the client device 106 can in a Unix implementation instead communicate with and recover configuration information from the file server or other equipment or location.

In a step 618, the client computer 106 configures its boot record from the configuration data obtained from the file server 306 and the SM server 308 in the network boot via the boot server 304 and the BMR server 302. Various registry and clean-up operations at the client computer 106, depending on the circumstances and particular states of the client computer 106, are then performed in a step 620. The step 620 can be automated at the client computer 106, automated over the network 100, manual by a user, or combinations thereof. An auto boot of the client computer 106 then follows in a step 622. After the auto boot of the step 622, additional post-boot adjustments and set-up is performed to cause the client computer 106 to conform in all respects to the status and files at the time of the most recent backup by the storage manager application and at the time the failure occurred. The step 622 is performed automatically by the client computer 106 or over the network 100 by communications with another network device, by manual steps of the user of the client device 106 or over the network 100 by the system administrator, or otherwise or through combinations of the foregoing, all with the result that the client computer 106 is fully restored to the state prior to the failure.

In operation of the systems 100, 300, and the methods 200, 400, 500, and 600, numerous alternative business and technical arrangements are possible. Although only particular devices of a communications network and its nodes are herein described and discussed, particularly, the server computer 104 and the client computer 106, it is to be expressly understood that such network will typically include numerous client devices served by the server computer 104 and the storage manager application. In fact, combinations of client devices, such as the client computer 106 and others, as well as server devices, such as the server computer 104, its various server components 300, and others, including, for example, those elements, pluralities of any, certain ones, all of those elements, and even additional or alternative elements, and other combinations, are all possible in keeping with the scope of the embodiments herein. The network, itself, can, for example, be an intranet, even an intranet combination or intranet-extranet combination, a wide or local area network, a global network, such as the Internet, or otherwise. Numerous banks of server devices and elements, and pluralities of client devices or elements, can be possible for restoration according to the embodiments. Moreover, the various devices can be disparately located and distributed, and can be can be centrally located or distributed through a wide geographic area in various combinations and arrangements. In the case of a global network such as the Internet, the network is capable of communicating by its protocols, which may include standard or specialized protocols and operations for specific situations.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention.

Benefits, other advantages, and solutions to problems have been described above with regard to specific embodiments. However, the benefits, advantages, solutions to problems and any element(s) that may cause any benefit, advantage, or solution to occur or become more pronounced are not to be construed as a critical, required, or essential feature or element of any or all the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A device restoration system, for restoring a client device to a state prior to a major failure, comprising:
    a server device;
    a network communicatively interconnecting the client device and the server device;
    a storage manager accessible to the server device for saving the state, wherein the state includes client disk configuration information; and
    a network boot in which the server device causes the client device to boot.

2. A method of restoring a client device of a network on failure of the client device, wherein the network includes a server computer, comprising the steps of:
    booting the client device via a network boot;
    creating a boot program for operation on the client device;
    configuring the client device according to the boot program and a saved configuration state including client disk configuration information;
    copying a file to the client device in accordance with a configuration from the step of configuring.

3. The method of claim 2, wherein the steps of booting, creating, configuring, and copying are performed through communications over the network between the client device and the server computer.

4. The method of claim 2, wherein the step of booting is performed by a boot server of the network.

5. The method of claim 2, wherein the step of creating is performed by the server computer and the boot program is communicated to the client device.

6. The method of claim 2, wherein the step of configuring the client device is performed by a file server of the network and a storage manager.

7. The method of claim 2, wherein the step of copying is performed by a storage manager server of the network.

8. The method of claim 2, further comprising the step of:
    storing an image of the client device via a storage manager application of a server device of the network.

9. The method of claim 8, wherein the step of storing is performed by a standard storage manager application and includes backup of the configuration state of the client computer.

10. The method of claim 9, wherein the step of booting is performed by a boot server of the network; the step of creating is performed by a restore server of the network; the step of configuring is performed by a file server of the network and a storage manager server of the network; and the step of copying is performed by the file server and the storage manager.

11. A method of restoring a client device of a network, the network including a server device having a storage manager application, comprising the steps of:
    backing up configuration data including client disk configuration information, as well as application and data files, by the storage manager application; and
    restoring the backed up configuration data, as well as application and data files, from the step of backing up, to the client device over the network.

12. The method of claim 11, further comprising the step of: booting the client device via a standard network boot.

13. The method of claim 12, further comprising the step of:
    supplying to the client device a boot program; and
    using the boot program at the client device to perform the step of restoring.

14. The method of claim 11, wherein the client device is remote from the storage manager application.

15. The method of claim 12, wherein the step of booting is initiated remote from the client device.

16. A device restoration system, for restoring a client device to a state prior to a major failure, comprising:
    a controlling device connected to the client device, for resetting the client device;
    a storage manager communicatively connected to the client device, for saving the state, wherein the state includes client disk configuration information; and a boot program for operating the client device, communicatively connected to the storage manager, and causing the client device to boot with the state.

17. A method of restoring a client device on failure of the client device, comprising the steps of:
saving a state of the client device, including client disk configuration information, prior to the failure;
resetting the client device;
booting the client device; and
configuring the client device according to the state from the step of saving.

18. A system comprising:
backup software; and
a restoration server;
wherein the backup software is configured to create one or more backups of a client device, wherein at least one backup of the one or more backups comprises client disk configuration information; and
wherein, following a failure of the client device, the restoration server is configured to:
perform a network boot of the client device; and
restore a client disk configuration using the client disk configuration information.

19. The system of claim 18, wherein the restoration server is further configured to copy a boot image to the client device over a network.

20. The system as recited in claim 18, wherein the restoration server is further configured to mount one or more files at the client device over a network.

21. The system as recited in claim 20, wherein the one or more files include an operating systems configuration file.

22. The system as recited in claim 18, wherein the restoration server is further configured to reestablish one or more logical volumes at the client device.

23. The system as recited in claim 18, wherein the restoration server is further configured to set up one or more file systems at the client device.

* * * * *

UNITED STATES PATENT AND TRADEMARK OFFICE
CERTIFICATE OF CORRECTION

| | | |
|---|---|---|
| PATENT NO. | : 6,931,558 B1 | |
| DATED | : August 16, 2005 | |
| INVENTOR(S) | : Peter Jeffe, Bruce Bramhall and Raymond Charles Schafer | |

It is certified that error appears in the above-identified patent and that said Letters Patent is hereby corrected as shown below:

<u>Title page,</u>
Item [75], Inventors, should read as following:
-- Peter Jeffe, Bruce Bramhall, and Raymond Charles Schafer --.

Signed and Sealed this

Sixth Day of December, 2005

JON W. DUDAS
*Director of the United States Patent and Trademark Office*

(12) INTER PARTES REVIEW CERTIFICATE (58th)
United States Patent
Jeffe et al.

(10) Number: US 6,931,558 K1
(45) Certificate Issued: Mar. 11, 2015

(54) COMPUTER RESTORATION SYSTEMS AND METHODS

(75) Inventors: Peter Jeffe; Bruce Bramhall; Raymond Charles Schafer

(73) Assignee: Symantec Corporation

Trial Numbers:

IPR2013-00141 filed Feb. 13, 2013
IPR2013-00142 filed Feb. 13, 2013

Petitioner: Veeam Software Corporation

Patent Owner: Symantec Corporation

Inter Partes Review Certificate for:

Patent No.: 6,931,558
Issued: Aug. 16, 2005
Appl. No.: 09/998,246
Filed: Nov. 30, 2001

The results of IPR2013-00141 and IPR2013-00142 are reflected in this inter partes review certificate under 35 U.S.C. 318(b).

INTER PARTES REVIEW CERTIFICATE
U.S. Patent 6,931,558 K1
Trial No. IPR2013-00141
Certificate Issued Mar. 11, 2015

AS A RESULT OF THE INTER PARTES REVIEW PROCEEDING, IT HAS BEEN DETERMINED THAT:

Claims 1-15 and 17-23 are cancelled.

* * * * *